United States Patent
Aoishi et al.

(10) Patent No.: US 7,016,153 B2
(45) Date of Patent: Mar. 21, 2006

(54) MAGNETIC DISK CARTRIDGE

(75) Inventors: Harumi Aoishi, Odawara (JP); Fumihito Imai, Odawara (JP); Hideaki Shiga, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 145 days.

(21) Appl. No.: 10/618,703

(22) Filed: Jul. 15, 2003

(65) Prior Publication Data

US 2004/0012886 A1 Jan. 22, 2004

(30) Foreign Application Priority Data

Jul. 17, 2002 (JP) .............................. 2002-208370

(51) Int. Cl.
*G11B 23/03* (2006.01)

(52) U.S. Cl. ..................................................... 360/133

(58) Field of Classification Search ................. 360/133
See application file for complete search history.

(56) References Cited

U.S. PATENT DOCUMENTS 6,198,598 B1 * 3/2001 Meguro ...................... 360/133
6,256,168 B1 7/2001 Hales et al.

FOREIGN PATENT DOCUMENTS

JP 2000-34663 A 2/2000

* cited by examiner

*Primary Examiner*—Robert S. Tupper
(74) *Attorney, Agent, or Firm*—Sughrue Mion, PLLC

(57) ABSTRACT

A magnetic disk cartridge comprising a magnetic disk medium, a casing for rotatably housing the magnetic disk medium, and dust-removing liners fixed on the inner surfaces of the casing which face both sides of the magnetic disk medium. Each of the liners has an outer circumferential portion that is not fixed on the inner surface of the casing.

8 Claims, 2 Drawing Sheets

MAGNETIC DISK CARTRIDGE

BACKGROUND OF THE INVENTION

1. Field of the Invention

The present invention relates to a magnetic disk cartridge in which a magnetic disk medium is rotated within a casing to perform magnetic recording and reproduction, and more particularly to a magnetic disk cartridge with dust-removing liners provided on the inner surface of a casing.

2. Description of the Related Art

In conventional magnetic disk cartridges, a magnetic disk medium is constructed of a discoid substrate, which is formed from a flexible polyester sheet, etc. This magnetic disk medium has magnetic layers deposited on both sides of the substrate, and is rotatably housed in a casing. The casing is formed by bonding upper and lower shells together, and each shell has a head slot through which a magnetic head is positioned over a recording surface of the magnetic disk medium. This kind of magnetic disk cartridge is used primarily as a recording medium for computers, because it is easy to handle and low-cost.

In the above-described magnetic disk cartridge, if tiny particles (dust, etc.) adhere to the magnetic disk medium, they will cause a dropout error. The problem of this dropout error will arise more easily if the recording density of the magnetic disk medium becomes higher. Hence, for example, in most 3½-inch magnetic disk cartridges, etc., liners for removing tiny particles (dust, etc.) from the magnetic disk medium are arranged on the casing inner surfaces (inner surfaces of the upper and lower shells of the casing) that face both sides of the magnetic disk medium.

In conventional magnetic disk cartridges, the above-described liners are generally formed from a material whose surface is napped, and the napped surface makes contact with the magnetic disk medium. By bringing such a surface into contact with the magnetic disk medium being rotated, tiny particles (dust, etc.) are removed from the magnetic disk medium. However, in conventional magnetic disk cartridges with such liners, there are cases where tiny particles (dust, etc.) cannot be removed sufficiently from the magnetic disk medium.

In conventional magnetic disk cartridges, to enhance the effect of contacting the magnetic disk medium, the dust-removing liner is provided with protrusions that protrude toward the magnetic disk medium. The liner with such protrusions is able to enhance the effect of contacting the magnetic disk medium, so the cleaning effect of the liner is enhanced, but there are cases where even such a liner cannot remove tiny particles (dust, etc.) sufficiently from the magnetic disk medium. Note that in the conventional magnetic disk cartridges, the circumferential width of the protrusions provided on the liner has been made constant from the inner circumference of the liner toward the outer circumference because of the manufacture of the horn of an ultrasonic welding device that welds a liner to a cartridge casing.

SUMMARY OF THE INVENTION

The present invention has been made in view of the circumstances described above. Accordingly, it is the object of the present invention to provide a magnetic disk cartridge that is capable of sufficiently removing tiny particles (dust, etc.) from a magnetic disk medium.

To achieve this end and in accordance with the present invention, there is provided a first magnetic disk cartridge comprising a magnetic disk medium, a casing, and dust-removing liners. The casing has head slots and is used for rotatably housing the magnetic disk medium. The dust-removing liners are fixed on the inner surfaces of the casing which face both sides of the magnetic disk medium. Each of the liners has an outer circumferential portion that is not fixed on the inner surface of the casing.

In accordance with the present invention, there is provided a second magnetic disk cartridge comprising a magnetic disk medium, a casing for rotatably housing the magnetic disk medium, and dust-removing liners fixed on the inner surfaces of the casing which face both sides of the magnetic disk medium. Each of the liners is provided with protrusions that protrude toward the magnetic disk medium, each of the protrusions having a circumferential width that gradually increases from its radially inner end toward its radially outer end.

The inventors have made various investigations and experiments with respect to the reason why conventional magnetic disk cartridges cannot obtain a sufficient cleaning effect by dust-removing liners, and have found the following facts. That is, tiny particles (dust, etc.) are caused to move toward the outer circumference of a magnetic disk medium by centrifugal force produced by rotation of the magnetic disk medium, and the dust-removing liners cannot sufficiently remove those tiny particles moved to the outer circumferential portion.

In view of the above facts, the first magnetic disk cartridge of the present invention is constructed such that the dust-removing liner has an outer circumferential portion, facing the outer circumferential portion of the magnetic disk medium, which is not fixed on the inner surface of the casing. This portion of the liner is arranged away from the inner surface of the casing, so the effect of contact with the magnetic disk medium becomes high. Thus, tiny particles (dust, etc.), caused to move to the outer circumferential portion of the magnetic disk medium, are more reliably wiped out and captured by the liners. In this way, the first magnetic disk cartridge of the present invention is capable of achieving a sufficient cleaning effect by the liners.

In the case where the magnetic disk medium is of a 3.5-inch type, the above-described outer circumferential portion of the liner which is not fixed on the inner surface of the casing is preferably in a range of about 2 to 3 mm inwardly from the outer circumferential edge of the magnetic disk medium. In the case where the magnetic disk medium is of a 1.8-inch type, the outer circumferential portion of the liner is preferably in a range of about 1 mm inwardly from the outer circumferential edge of the magnetic disk medium.

If the outer circumferential portion of the liner is not fixed on the inner surface of the casing, then there is a possibility that the fibers of the liner material will fray at the outermost edge. The fibers from the liner material also adhere to a magnetic disk medium and can be the cause of a dropout error. In the first magnetic disk cartridge, to prevent the fray problem, it is desirable that the outer edge portion of the liner be hardened by heat welding or adhesion employing an adhesive.

On the other hand, the aforementioned protrusions on the liner enhance the cleaning effect, but since the circumferential speed of the magnetic disk medium increases from the inner circumference toward the outer circumference, the cleaning effect of the liner becomes smaller at the outer circumference of the magnetic disk medium than at the inner circumference. Because of this and in combination with the fact that rotation of the magnetic disk medium causes tiny particles (dust, etc.) to move toward the outer circumference of the magnetic disk medium, even liners with protrusions could not remove tiny particles sufficiently.

Hence, in the second magnetic disk cartridge of the present invention, each of the protrusions that are provided on the dust-removing liners is constructed such that the circumferential width gradually increases from its radially inner end toward its radially outer end. Because of this, the length of contact with the protrusion per one revolution of the magnetic disk medium becomes longer at the outer circumference whose circumferential speed is higher, so the cleaning effect is enhanced. Thus, tiny particles (dust, etc.), concentrated at the outer circumferential portion of the magnetic disk medium, are reliably wiped out and captured by the liners. In this manner, the second magnetic disk cartridge of the present invention is capable of achieving a sufficient cleaning effect by the liners.

In the first and second magnetic disk cartridges of the present invention described above, it is desirable that a material for the dust-removing liners have a great dust-removing effect. Examples are woven fabric consisting of extra fine and long polyester fibers such as "TORACY™" (Toray Industries); nonwoven fabric consisting of long nylon fibers such as "LTAS (nylon)™" (Asahi Chemical); nonwoven fabric consisting of long polyester fibers such as "LTAS (polyester)™" (Asahi Chemical); nonwoven fabric consisting of long polypropylene fibers such as "LTAS (polypropylene)™" (Asahi Chemical); pressure-applied nonwoven fabric consisting of long polyester fibers such as "LTAS (polyesters EH5045 and EH5045C)™" (Asahi Chemical); resin-coated nonwoven fabric consisting of long polyester fibers such as "LTAS (polyester E01100)™" (Asahi Chemical); resin-coated nonwoven fabric consisting of long polyester fibers such as "LTAS (polyester E01100) ™" (Dai Nihon Jochugiku); and nonwoven fabric formed by fusing a fiber web, consisting of a mixture of a fusible fiber and a non-fusible fiber, which is used in a cleaning sheet such as "Kincho Sassa™" (Dai Nihon Jochugiku) and "Quick Wiper™" (Kao). As described in detail in Japanese Unexamined Patent Publication No. 2000-34663, the above-described fusible fiber includes a single type fiber, and a complex fiber of a parallel structure or center sheath structure consisting of a low fusing-point component and a high fusing-point component. Examples of components that constitute the above-described composite fiber include the following components. Note that a component in the case of a single type fiber can employ normal polypropylene (PP) in addition to the following low fusing-point components. A low fusing-point component preferably has a fusing point of 100 to 220° C. Preferred examples are a copolymer consisting of polyethylene (PE), polybutene, ethylene (and/or butene), and α-olefin; low fusing-point PP, such as a block copolymer, a random copolymer, and a graft copolymer, known as a copolymer consisting of propylene and α-olefin; low fusing-point polyester in which, in polyethylene terephthalate (PET) or polybutylene terephthalate (PBT), at least 1 part of the terephthalic acid unit is replaced with dicarbonic acid; and so forth. For the above-described low fusing-point component, two or more components can also be blended. Also, a high fusing-point component preferably has a fusing point of 160 to 260° C. Preferred examples are polyester such as PET, PBT, etc.; PP; a methyl pentane copolymer; polyamide such as nylon 6, nylon 66, etc.; and so on. On the other hand, the above-described non-fusible component includes a polyester component such as PET, PBT, etc.; a rayon component; a cupola component; an acetate component such as acetate, triacetate, etc.; a polyimide component such as nylon 6, nylon 66, etc.; a polyacrylonitrile component such as acrylic, etc.; a fluorine component; and so on.

Preferred materials for the dust-removing liners further include nonwoven fabric consisting of extra fine polyester fibers such as a wiping cloth "SIRU Rhythm™" (Toray Industries); a suede sheet such as "GS Felt™" (Toray Industries); polyurethane foam such as "PORON™" (Inoakku Corporation); polyethylene foam such as "SOFTRON™" (Sekisui Chemical); polyolefin foam such as "PEF™" (Toray Industries); a cellulose sponge; a material that constitutes a napped light-intercepting member (teremp) provided in the film pulling-out hole of a 35-mm photographic film cartridge; various kinds of multilayer nonwoven fabric; monolayer nonwoven fabric; and so on.

Preferred examples of the material of the above-described teremp are SEIREN ribbon "SG ribbon" (Seiren); SEIREN ribbon "SV ribbon" (Seiren); infrared-ray absorbing ribbon "IR ribbon" (Seiren); and so on.

Also, preferred examples of the above-described multilayer nonwoven fabric are multilayer nonwoven fabric consisting of a mixed spinning layer of 40% rayon and 60% PET and a polypropylene layer, such as "8822" (BBA Nonwovens) (the layers are stacked from the side of a magnetic disk medium towards a casing in the recited order, and the same applies to the following description); multilayer nonwoven fabric consisting of a rayon layer, a mixed spinning layer of 50% rayon and 50% nylon, and arayon layer, such as "9900" (BBA Nonwovens) ; multilayer nonwoven fabric consisting of a mixed spinning layer of 50% rayon and 50% PET, a first PET layer, and a second PET layer, such as "9405AM" (BBA Nonwovens); and so on.

Furthermore, preferred examples of the above-described monolayer nonwoven fabric are "9788" and "9688" (BBA Nonwovens); "1565" and "TR2081A" (Hollings Worth & Vose); monolayer nonwoven fabric consisting of mixed spinning of 50% rayon and 50% PET such as "TK462B" (Mitsubishi Rayon); monolayer nonwoven fabric consisting of rayon such as "TR1933B" (Hollings Worth & Vose); monolayer nonwoven fabric consisting of mixed spinning of acrylic and PET, such as "1889," "1859," and "1888" (Japan Vilene); and so on.

To minimize the occurrence of dust during manufacture of a magnetic disk cartridge, if the casing is formed from a material to which dust is less liable to adhere, or the surface of the casing or magnetic disk medium is treated by metal deposition or sputtering, the occurrence of a dropout error can be effectively prevented. An example of such a casing material is ABS resin "PARERU™" (Toray Industries).

BRIEF DESCRIPTION OF THE DRAWINGS

The present invention will be described in further detail with reference to the accompanying drawings wherein.

DESCRIPTION OF THE PREFERRED EMBODIMENTS

Figure 1:
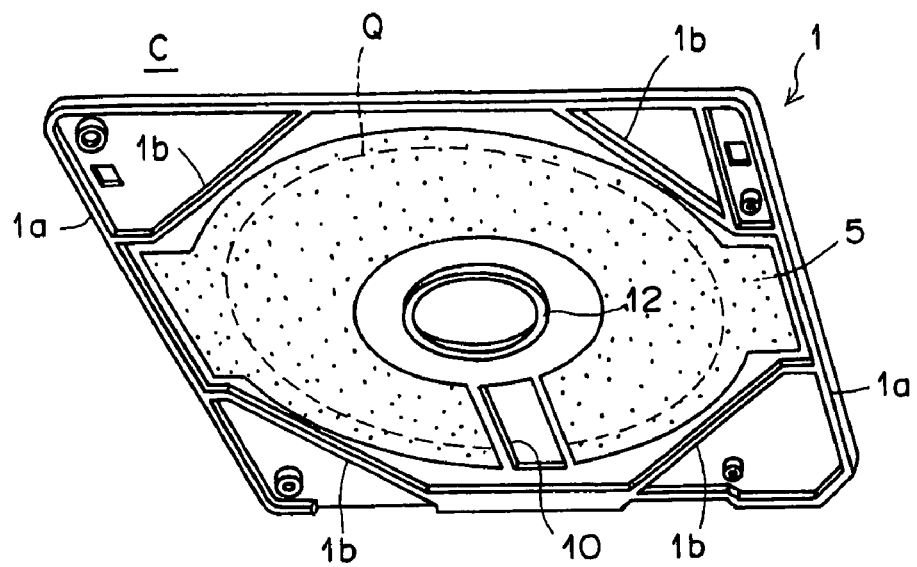
FIG. 1 is an exploded perspective view showing a magnetic disk cartridge constructed in accordance with a first embodiment of the present invention.
Figure 1:
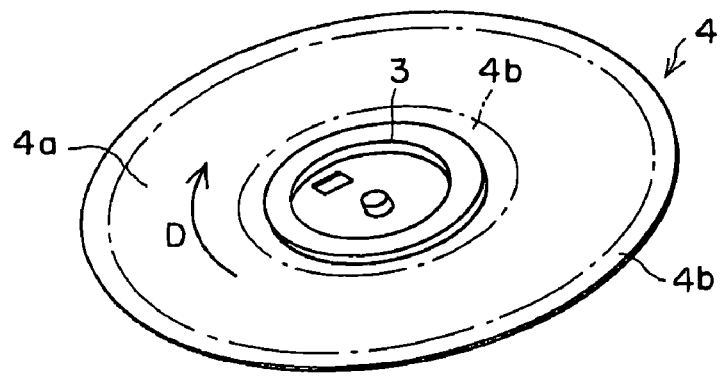
Figure 1:
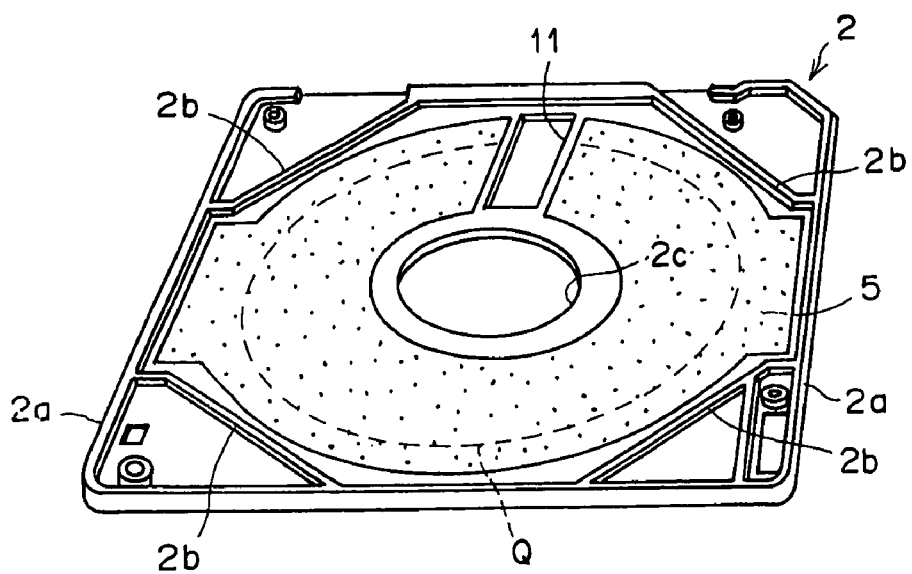

Referring now to FIG. 1, there is shown a magnetic disk cartridge constructed in accordance with a first embodiment of the present invention. A typical example of this magnetic disk cartridge is a disk cartridge for 3½-inch floppy disks. The magnetic disk cartridge is equipped with a casing (hard casing) C, a magnetic disk medium 4 rotatably housed in the casing C, and a pair of upper and lower dust-removing liners 5 arranged to face both sides of the magnetic disk medium 4. The casing C is formed by bonding an upper shell 1 and a lower shell 2 together, which are formed from synthetic resin such as an acrylonitrile-butadiene-styrene copolymer.

The magnetic disk medium 4 is constructed of a discoid substrate, which is formed from a flexible polyester sheet, etc. This magnetic disk medium 4 has magnetic layers deposited on both sides of the substrate. The magnetic disk medium 4 also has a recording area 4a between the outer circumference 4b and the inner circumference 4b, and the central portion of the magnetic disk medium 4 is fixedly held on a center core 3.

When the magnetic disk cartridge is inserted in a disk drive unit (not shown), a spindle engages the center core 3 and spins the magnetic disk medium 4 at a predetermined speed in the direction of arrow D.

The upper shell 1 and the lower shell 2 are flat and substantially rectangular in shape. The perimeters of the upper and lower shells 1, 2 are provided with ribs 1a, 2a constituting side walls, and the corners are provided with oblique reinforcement ribs 1b, 2b. The upper and lower shells 1, 2 further have upper and lower head slots 10, 11 through which read/write heads (not shown) are positioned over the recording areas 4a of both sides of the magnetic disk medium 4.

The central portion of the lower shell 2 has a drive spindle aperture 2c through which the spindle of the disk drive unit engages the center core 3. On the other hand, the central portion of the inner surface of the upper shell 1 is provided with an annular protrusion 12, which is located inside the annular portion of the outer circumference of the center core 3. This annular protrusion 12 is fitted in the annular portion of the center core 3 and regulates radial movement of the magnetic disk medium 4. Although not shown, there is provided a slidable shutter to cover the upper and lower head slots 10, 11 of the upper and lower shells 1, 2 when read and write operations are not performed.

The upper and lower liners 5 are fixedly attached on the inner surfaces of the upper and lower shells 1, 2 by supersonic welding, adhesion, etc., and each liner 5 has a portion that contacts approximately the whole surface of the recording area 4a of the magnetic disk medium 4. These liners 5 are the same in shape (symmetrical in shape). The upper liner 5 has a cutout larger than the upper head slot 10, and a central aperture larger than the annular protrusion 12. Likewise, the lower liner 5 has a cutout larger than the lower head slot 11, and a central aperture larger than the drive spindle aperture 2c.

In each of the liners 5, an area outside a circle indicated by a broken line Q in FIG. 1 (portion that faces the outer circumferential portion of the magnetic disk medium 4) is not fixed on the inner surface of the corresponding shell 1 or 2. That is, those portions are arranged to float off the inner surfaces of the upper and lower shells 1 and 2 of the casing. The effect of contact between the above-described area of each liner 5 and the magnetic disk medium 4 becomes high, so tiny particles (dust, etc.), moved to the outer circumference of the magnetic disk medium 4 by rotation of the magnetic disk medium 4, are reliably wiped out and captured by the upper and lower liners 5. In this way, the magnetic disk cartridge of the first embodiment is capable of achieving a sufficient cleaning effect by the upper and lower liners 5.

Note that a preferred range of the outer circumferential area of each liner 5 which is not fixed on the inner surface of the cartridge shell 1 or 2 is as previously described. Also, as described above, it is desirable that the outer edge portion of each liner 5 be hardened by heat welding or adhesion (which employs an adhesive) so that it does not fray.

Figure 2:
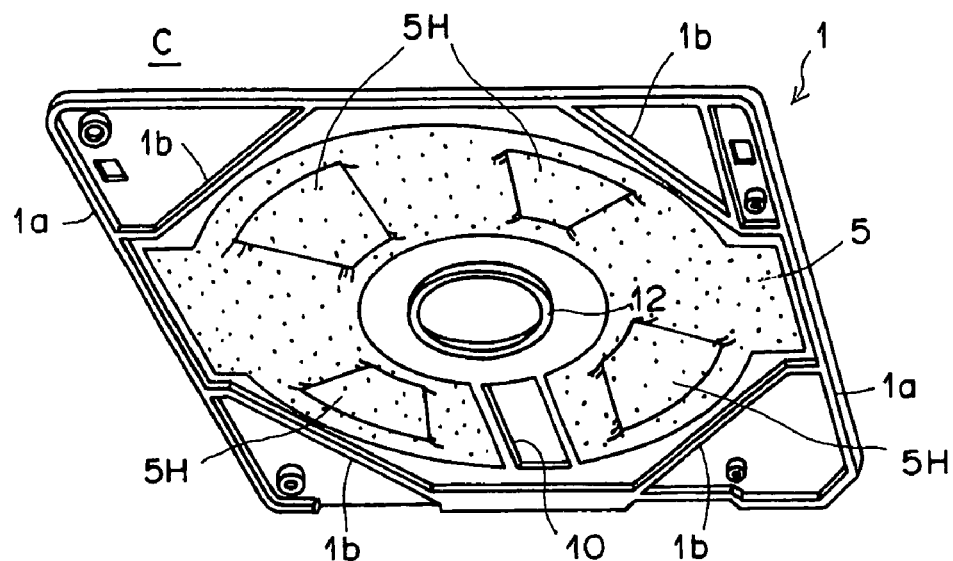
FIG. 2 is an exploded perspective view showing a magnetic disk cartridge constructed in accordance with a second embodiment of the present invention.
Figure 2:
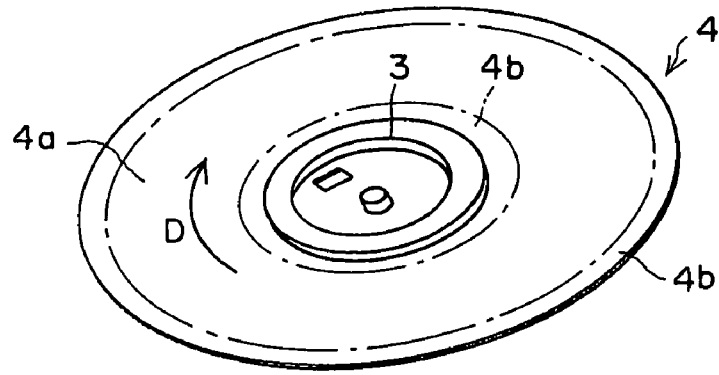
Figure 2:
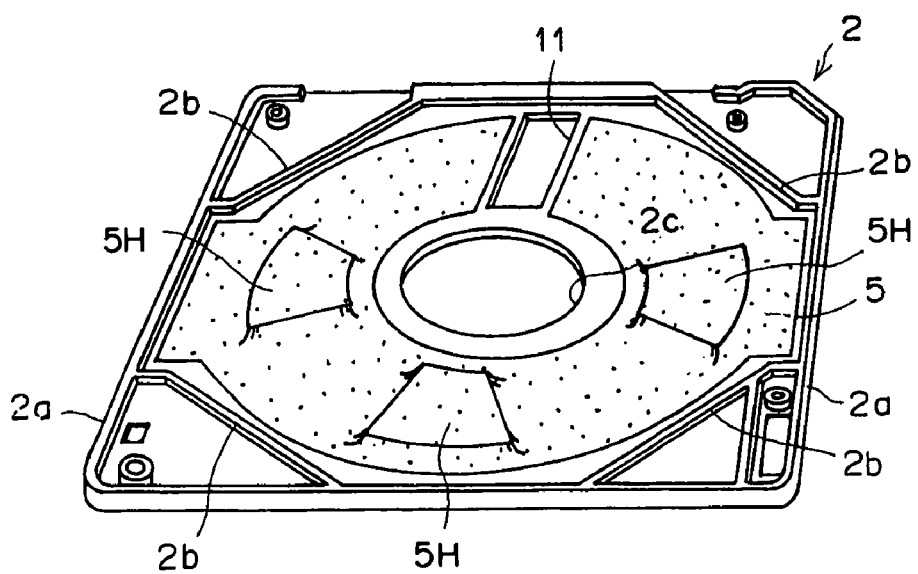

Referring now to FIG. 2, there is depicted a magnetic disk cartridge constructed in accordance with a second embodiment of the present invention. In the figure, the same reference numerals denote the same parts as the first embodiment of FIG. 1, and descriptions of the same parts will not be given unless particularly necessary. The magnetic disk cartridge of the second embodiment is basically different from that of the first embodiment in that the outer circumferential portion of each liner 5, as with the remaining portion, is fixed on a cartridge shell 1 or 2 and that each liner 5 is provided with protrusions 5H protruding toward a magnetic disk medium 4.

As an example, the liner 5 on the upper shell 1 is provided with 4 (four) protrusions 5H, while the liner 5 on the lower shell 2 is provided with 3 (three) protrusions 5H. In the second embodiment, the protrusions 5H of the upper shell 1 are not aligned vertically with those of the lower shell 2, but they may be aligned with one another.

By providing the above-described protrusions 5H, the effect of contact between the liners 5 and the magnetic disk medium 4 becomes high, so a better cleaning effect is obtained. In addition, the circumferential width of each protrusion 5H, as shown in FIG. 2, gradually increases from its radially inner end toward its radially outer end, so a length of contact with the magnetic disk medium 4 per one revolution becomes longer at the outer circumferential portion of the magnetic disk medium 4 where the circumferential speed is higher. Thus, the cleaning effect is enhanced. As with the first embodiment, tiny particles (dust, etc.), moved to the outer circumferential portion of the magnetic disk medium 4 by rotation of the medium 4, are reliably wiped out and captured by the upper and lower liners 5. In this manner, the second embodiment is also capable of achieving a sufficient cleaning effect by the upper and lower liners 5. Note that as in the first embodiment, the outer circumferential portions of the upper and lower liners 5 with the protrusions 5H may be arranged so that they are not fixed on the inner surfaces of the upper and lower shells 1 and 2.

While the present invention has been described with reference to the preferred embodiments thereof (3½-inch disk cartridges), the invention is not to be limited to the details given herein, but may be modified within the scope of the invention hereinafter claimed. For instance, the invention is also applicable to a magnetic disk cartridge in which a smaller magnetic disk medium is housed within a casing. In this case, the above-described advantages are similarly obtained. Such a magnetic disk cartridge is disclosed, for example, in U.S. Pat. No. 6,256,168 which is incorporated herein by reference.

What is claimed is:

1. A magnetic disk cartridge comprising:
   a magnetic disk medium;
   a casing, which has head slots, for rotatably housing said magnetic disk medium; and
   dust-removing liners fixed on inner surfaces of said casing which face both sides of said magnetic disk medium;
   wherein each of said liners has an outer circumferential portion that is not fixed on the inner surface of said casing, and
   wherein each of said liners has an outer edge portion hardened by heat welding or adhesion employing an adhesive.

2. The magnetic disk cartridge as set forth in claim 1, wherein
   said magnetic disk medium is of a 3.5-inch type; and
   the outer circumferential portion of said liner is in a range of approximately 2 to 3 mm inwardly from an outer circumferential edge of said magnetic disk medium.

3. The magnetic disk cartridge as set forth in claim 1, wherein
   said magnetic disk medium is of a 1.8-inch type; and
   the outer circumferential portion of said liner is in a range of approximately 1 mm inwardly from the outer circumferential edge of said magnetic disk medium.

4. The magnetic disk cartridge according to claim 1, wherein the outer circumferential portion of said liner comprises an area of dust particles resulting from centrifugal force.

5. The magnetic disk cartridge according to claim 1, wherein the outer circumferential portion of said liner is arranged to float off the inner surface of the said casing.

6. The magnetic disk cartridge according to claim 1, wherein the outer circumferential portion of said liner comprises an area parallel with a non recording area of the magnetic disk medium.

7. The magnetic disk cartridge according to claim 1, wherein an entire outer circumferential portion of each of the liners is not fixed on the inner surface of said casing.

8. The magnetic disk cartridge according to claim 1, wherein the outer circumferential portion of each of the liners is arranged away from the inner surface of said casing.

* * * * *